(12) United States Patent
Duarte

(10) Patent No.: US 11,984,753 B2
(45) Date of Patent: May 14, 2024

(54) MOBILE-CHARGING MODULAR POWER SYSTEM

(71) Applicant: Ryan Duarte, Missoula, MT (US)

(72) Inventor: Ryan Duarte, Missoula, MT (US)

( * ) Notice: Subject to any disclaimer, the term of this patent is extended or adjusted under 35 U.S.C. 154(b) by 0 days.

(21) Appl. No.: 17/726,900

(22) Filed: Apr. 22, 2022

(65) Prior Publication Data

US 2022/0344964 A1 Oct. 27, 2022

Related U.S. Application Data

(60) Provisional application No. 63/178,115, filed on Apr. 22, 2021.

(51) Int. Cl.
| | | |
|---|---|---|
| *H02J 7/14* | (2006.01) | |
| *H02J 7/00* | (2006.01) | |
| *H02J 7/35* | (2006.01) | |
| *H02S 10/10* | (2014.01) | |
| *H02S 10/20* | (2014.01) | |
| *H02S 40/32* | (2014.01) | |

(52) U.S. Cl.
CPC .......... *H02J 7/1415* (2013.01); *H02J 7/0047* (2013.01); *H02J 7/35* (2013.01); *H02S 10/10* (2014.12); *H02S 10/20* (2014.12); *H02S 40/32* (2014.12); *H02J 2207/20* (2020.01)

(58) Field of Classification Search
CPC .......... H02J 7/1415; H02J 7/0047; H02J 7/35; H02J 2207/20; H02S 10/10; H02S 10/20; H02S 40/32; H02S 10/40; H02S 30/20; B60L 1/006; B60L 2200/28; B60L 53/51; B60L 53/53; B60L 53/57; Y02T 10/7072
See application file for complete search history.

(56) References Cited

U.S. PATENT DOCUMENTS

| | | | | |
|---|---|---|---|---|
| 2004/0048157 | A1* | 3/2004 | Neudecker | H01M 4/5825 |
| | | | | 427/126.3 |
| 2012/0085387 | A1* | 4/2012 | French, Sr. | H02S 20/30 |
| | | | | 136/246 |
| 2014/0285005 | A1* | 9/2014 | Casteel | H02S 10/40 |
| | | | | 320/101 |
| 2015/0153298 | A1* | 6/2015 | Chen | G01N 33/49 |
| | | | | 205/792 |

* cited by examiner

*Primary Examiner* — Lincoln D Donovan
*Assistant Examiner* — Alex W Lam
(74) *Attorney, Agent, or Firm* — Casimir Jones SC; Brian Bradley

(57) ABSTRACT

A mobile-charging power system including a mobile transportation unit including a housing and an axle; a battery assembly positioned within the housing; a power electronics module electrically coupled to the battery assembly; and an electro-mechanical generator electrically coupled to the power electronics module. The electro-mechanical generator is driven by the axle. The system further includes a solar power generator coupled to the housing. The solar power generator is electrically coupled to the power electronics module. The system further includes a controller electrically coupled to the battery assembly and the power electronics module; and a control panel electrically coupled to the power electronics module and the controller. The control panel includes a first electrical plug and a second electrical plug.

20 Claims, 4 Drawing Sheets

MOBILE-CHARGING MODULAR POWER SYSTEM

CROSS REFERENCE TO RELATED APPLICATIONS

This application claims priority to U.S. Provisional Patent Application No. 63/178,115 filed on Apr. 22, 2021, the entire contents of which are incorporated herein by reference.

FIELD

The present disclosure provides a mobile electrical power system.

BACKGROUND

Electrical power is desirable in many situations where plugging into a wall, a vehicle, a generator, or other power source wired to a grid is not possible. Even situations where a vehicle, a generator, or a fuel-powered source is available, many power sources are constrained by the amount of fuel available or power available to be stored.

SUMMARY

The Summary is provided to introduce a selection of concepts that are further described below in the Detailed Description. This Summary is not intended to identify key or essential features of the claimed subject matter, nor is it intended to be used as an aid in limiting the scope of the claimed subject matter.

One aspect of the present disclosure provides a mobile-charging power system including a mobile transportation unit with a housing and an axle; a battery assembly positioned within the housing; a power electronics module electrically coupled to the battery assembly; and an electro-mechanical generator electrically coupled to the power electronics module. The electro-mechanical generator is driven by the axle. The system further includes a solar power generator coupled to the housing. The solar power generator is electrically coupled to the power electronics module. The system further includes a controller electrically coupled to the battery assembly and the power electronics module, and a control panel electrically coupled to the power electronics module and the controller. The control panel includes a first electrical plug and a second electrical plug.

In some embodiments, the battery assembly includes a solid-state lithium battery.

In some embodiments, the solid-state lithium battery includes a polymer electrolyte and includes no liquid.

In some embodiments, the system further includes an actuator coupled to the axle and configured to move the axle.

In some embodiments, the actuator is a hydraulic actuator.

In some embodiments, the axle is a first axle and the mobile transportation unit further includes a second axle; and wherein the system further includes a sensor to detect a speed of the mobile transportation unit.

In some embodiments, the actuator moves the first axle in response to the speed of the mobile transportation unit detected by the sensor.

In some embodiments, the actuator moves the first axle in response to a voltage of the battery assembly exceeding a threshold voltage.

In some embodiments, the power electronics module includes an AC to DC converter.

In some embodiments, the power electronics module includes a DC to AC inverter.

In some embodiments, the power electronics module includes an AC to DC converter and a DC to AC inverter.

In some embodiments, the first electrical plug on the control panel is configured to discharge electrical current.

In some embodiments, the second electrical plug on the control panel is configured to receive electrical current.

In some embodiments, the battery assembly includes a battery management system that monitors a temperature, a charge rate, and a discharge rate of the battery assembly.

In some embodiments, the system is configured to be towed behind a vehicle.

In some embodiments, the electro-mechanical generator is coupled to a differential gear train.

In some embodiments, the system further includes a plug configured to electrically connect to a second mobile-charging modular power system.

In some embodiments, the mobile transportation unit is selected from a group comprised of a trailer, a vehicle, a fifth-wheel attached to a vehicle, or a fifth-wheel attached to a trailer.

BRIEF DESCRIPTION OF THE DRAWINGS

The accompanying figures and examples are provided by way of illustration and not by way of limitation. The foregoing aspects and other features of the disclosure are explained in the following description, taken in connection with the accompanying example figures ("FIG.") relating to one or more embodiments.

DETAILED DESCRIPTION

Figure 1:
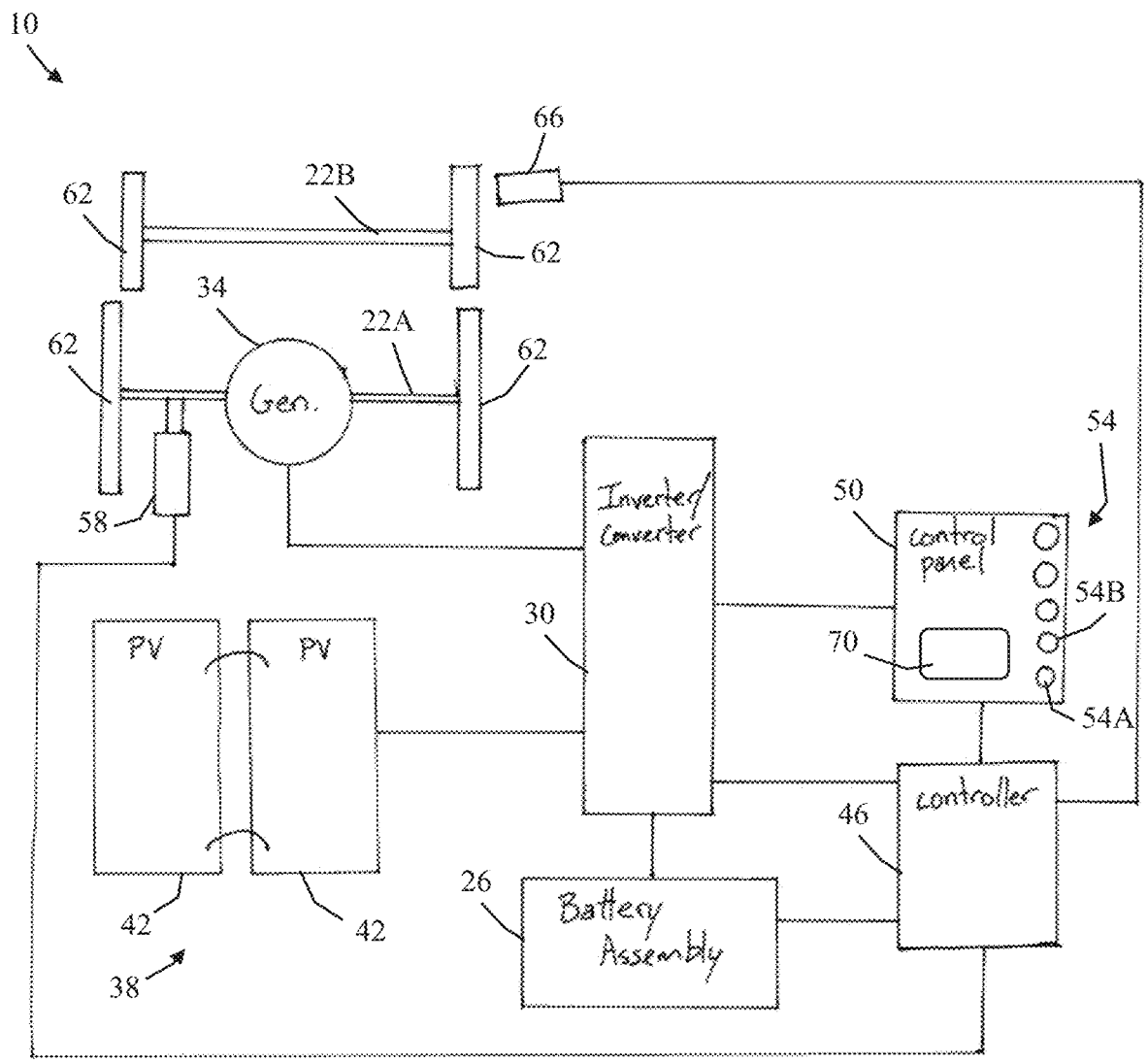
FIG. 1 is a schematic of a mobile-charging modular power system.

Unless otherwise defined, all technical and scientific terms used herein have the same meaning as commonly understood by one of ordinary skill in the art. The meaning and scope of the terms should be clear; in the event, however of any latent ambiguity, definitions provided herein take precedent over any dictionary or extrinsic definition.

Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. Unless otherwise required by context, singular terms shall include pluralities and plural terms shall include the singular. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

"About" and "approximately" are used to provide flexibility to a numerical range endpoint by providing that a given value may be "slightly above" or "slightly below" the endpoint without affecting the desired result.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "top" and "bottom", "front" and "rear", "inner" and "outer", "above", "below", "upper", "lower", "vertical", "horizontal", "upright" and the like are used as words of convenience to provide reference points.

The term "coupled," as used herein, is defined as "connected," although not necessarily directly, and not necessarily mechanically. The term coupled is to be understood to mean physically, magnetically, chemically, fluidly, electrically, or otherwise coupled, connected or linked and does not exclude the presence of intermediate elements between the coupled elements absent specific contrary language.

As used herein, the term "processor" (e.g., a microprocessor, a microcontroller, a processing unit, or other suitable programmable device) can include, among other things, a control unit, an arithmetic logic unit ("ALC"), and a plurality of registers, and can be implemented using a known computer architecture (e.g., a modified Harvard architecture, a von Neumann architecture, etc.). In some embodiments the processor is a microprocessor that can be configured to communicate in a stand-alone and/or a distributed environment, and can be configured to communicate via wired or wireless communications with other processors, where such one or more processor can be configured to operate on one or more processor-controlled devices that can be similar or different devices.

As used herein, the term "memory" is any memory storage and is a non-transitory computer readable medium. The memory can include, for example, a program storage area and the data storage area. The program storage area and the data storage area can include combinations of different types of memory, such as a ROM, a RAM (e.g., DRAM, SDRAM, etc.), EEPROM, flash memory, a hard disk, a SD card, or other suitable magnetic, optical, physical, or electronic memory devices. The processor can be connected to the memory and execute software instructions that are capable of being stored in a RAM of the memory (e.g., during execution), a ROM of the memory (e.g., on a generally permanent bases), or another non-transitory computer readable medium such as another memory or a disc. In some embodiments, the memory includes one or more processor-readable and accessible memory elements and/or components that can be internal to the processor-controlled device, external to the processor-controlled device, and can be accessed via a wired or wireless network. Software included in the implementation of the methods disclosed herein can be stored in the memory. The software includes, for example, firmware, one or more applications, program data, filters, rules, one or more program modules, and other executable instructions. For example, the processor can be configured to retrieve from the memory and execute, among other things, instructions related to the processes and methods described herein.

As used herein, the term "network" generally refers to any suitable electronic network including, but not limited to, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some embodiments, the network is a cellular network, such as, for example, a Global System for Mobile Communications ("GSM") network, a General Packet Radio Service ("GPRS") network, an Evolution-Data Optimized ("EV-DO") network, an Enhanced Data Rates for GSM Evolution ("EDGE") network, a 3GSM network, a 4GSM network, a 5G New Radio, a Digital Enhanced Cordless Telecommunications ("DECT") network, a digital AMPS ("IS-136/TDMA") network, or an Integrated Digital Enhanced Network ("iDEN") network, etc.

The electrical power system disclosed herein provides electrical power and enables individuals to conduct work, pleasure, survival, and other tasks. The mobile-charging modular power system described herein provides power without fuel limits and in places where wired power cannot be obtained. The mobile-charging modular power system recharges industrial batteries to provide electrical power and multiple instances of the mobile-charging modular power system can be connected to increase voltage and amperage as needed. The mobile-charging modular power system uses a power generation system wherein at least one axle on a trailer or vehicle generates electrical current which is then connected to batteries located in the trailer. The batteries in the trailer or vehicle may be powered by other sources when at rest, specifically including solar panels which allows the batteries to maintain power when the trailer is at rest. In some embodiments, the system is configured for military deployment.

Figure 2:
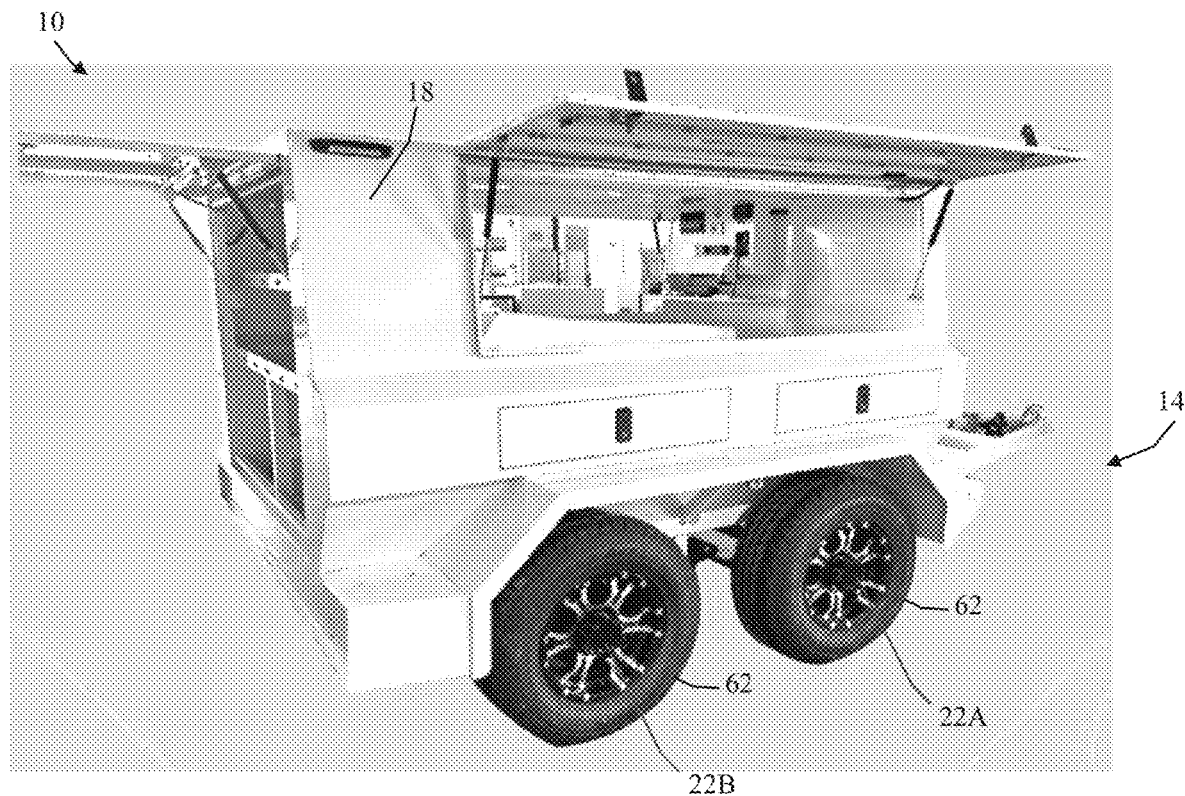
FIG. 2 is a perspective view of the mobile-charging module power system including a mobile transportation unit.
Figure 3:
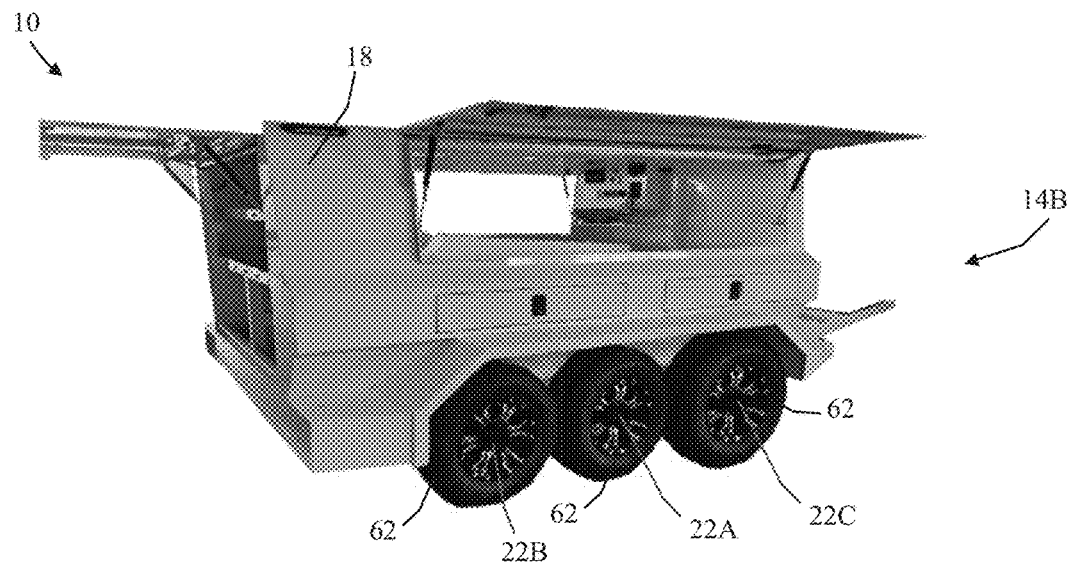
FIG. 3 is a perspective view of the mobile-charging module power system including mobile transportation unit with an adjustable third axle.

With reference to FIGS. 1-2, a mobile-charging power system 10 includes a mobile transportation unit 14 (e.g., a trailer, a vehicle, a fifth-wheel attached to a vehicle, or a fifth-wheel attached to a trailer). In some embodiments, the system 10 is configured to be towed behind a vehicle. The mobile transportation unit 14 includes a housing 18 and axles 22A, 22B. One example embodiment of the mobile transportation unit is shown in FIG. 2. Another example embodiment of the mobile transportation unit 14B is shown in FIG. 3 and includes three axles 22A, 22B, 22C.

The system 10 further includes a battery assembly 26 positioned within the housing 18 and a power electronics module 30 electrically coupled to the battery assembly 26. An electro-mechanical generator 34 is electrically coupled to the power electronics module 30 and is mechanically coupled to at least one of the axles 22A, 22B. In other words, the electro-mechanical generator 34 is driven by the axle (22A and/or 22B). In some embodiments, a belt mechanically couples the electro-mechanical generator 34 and the axle. In some embodiments, the electro-mechanical generator 34 is coupled to a differential gear train.

The system 10 further includes a solar power generator 38 coupled to the housing 18 and electrically coupled to the power electronic module 30. In some embodiments, the solar power generator 38 is removable from the housing 18 and/or movable from a stored position to a deployed position. In some embodiments, the solar power generator 38 includes at least two solar (e.g., photovoltaic, PV) panels 42. In other words, the solar power generator 38 is scalable. In one embodiment, the system 10 includes a 500-Watt solar panel which is 48 volts and 10 amps. As described, the system 10 can be paired with one or more solar panels, for example three 500 W solar panels per main unit for a max input of 1500 W. The system is scalable and can be connected to multiple power generating sources to increase the total capacity. Being scalable allows each mobile-charging modular power system to be portable but also allows connection of multiple mobile-charging modular power systems for a larger fixed or mobile system. The solar power generating element (e.g., a portable solar panel) may be connected to the system 10 or configured in a grid to produce direct current (DC) which charges the battery assembly 26 while the mobile transportation unit 14 is at rest. In some embodiments, the solar panels 42 are electrically coupled directly to the power electronic module 30. In other embodiments, the solar panels 42 are electrically coupled to one of the plurality of plugs 54 on the control panel 50.

A controller 46 (e.g., a processor) is electrically coupled to the battery assembly 26 and the power electronics module 30. A control panel 50 is electrically coupled to the power electronics module 30 and the controller 46. The control panel 50 includes a plurality of electrical plugs 54 including a first electrical plug 54A and a second electrical plug 54B.

In some embodiments, the battery assembly 26 includes a solid-state lithium battery. In some embodiments, the solid-state lithium battery includes a polymer electrolyte and includes no liquid. The battery assembly 26 advantageously can be puncture (e.g., from a bullet in the combat field) and not fail completely.

The system 10 further includes an actuator 58 coupled to the axle 22A and configured to move the axle 22A. In some embodiments, the actuator 58 is a hydraulic actuator. Moving the axle 22A that is coupled to the electro-mechanical generator 34 is advantageous because the axle 22A and its associated ground engaging members 62 (e.g., wheels, tracks, etc.) are moved in and out of engagement with the ground to selectively drive (e.g., rotate) the electro-mechanical generator 34. In other words, with the ground engagement members 62 in contact with the ground, rotation of the axle 22A occurs when the mobile transportation unit 14 moves, and the rotation drives the electro-mechanical generator 34. With the ground engagement members 62 spaced from the ground, the axle 22a stop rotating (even when the mobile transportation unit 14 is moving) and the power generation from the electro-mechanical generator 34 is halted.

In some embodiments, the system 10 includes a sensor 66 to detect a speed of the mobile transportation unit 14. The actuator 58 is configured to move the axle 22A in response to the speed of the mobile transportation unit 14 detected by the sensor 66. In other words, at very high speeds and very low speeds it may be beneficial to disengage the axle 22A and the electro-mechanical generator 34. Choosing instead to lift the axle 22A and the associated ground engaging members 62 up off the ground. In some embodiments, the actuator 58 moves the axle 22A in response to a voltage of the battery assembly 26A exceeding a threshold voltage. In other words, when the battery assembly 26A is fully charged, the axle 22A is moved to an idle position to halt generation of additional electrical power from the electro-mechanical generator 34. In some embodiments, the actuator 58 is manual actuated to lift or drop the generation axle.

With reference to FIG. 3, the mobile transportation unit 14B is shown with three axels 22A, 22B, 22C (referred to herein as a fifth wheel), which includes at least one electrical generating device connected to at least one of the axles 22A, 22B, and/or 22C to generate electrical power. In some embodiments, the actuator 58 is coupled to the third axle to move (e.g., raise and lower the third axle).

In some embodiments, the power electronics module 30 includes an AC to DC converter. In some embodiments, the power electronics module 30 includes a DC to AC inverter. In some embodiments, the power electronic module 30 includes a DC to DC converter. In some embodiments, the power electronics module includes an AC to DC converter and a DC to AC inverter.

Figure 5:
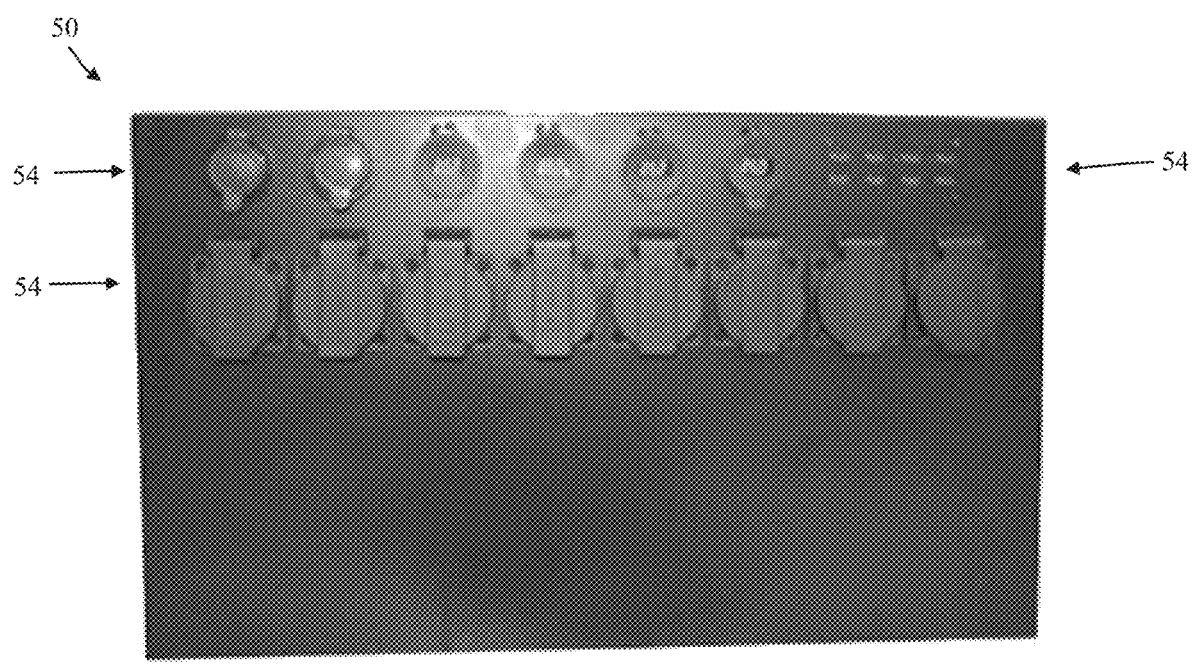
FIG. 5 is a side view of a control panel including a plurality of electrical plugs.

With reference to FIG. 5, the control panel 50 includes a plurality of plugs 54 to provide a power distribution connection, for example. In the illustrated embodiment, the first electrical plug 54A on the control panel 50 is configured to discharge electrical current, and the second electrical plug 54B on the control panel 50 is configured to receive electrical current. In some embodiments, one of the plurality of plugs 54 is a 110 volt AC plug, a 220 volt AC plug, a USB plug, a 12 volt DC plug, or a USBC fast charging 2.9A plug. In some embodiments, one of the plurality of plugs 54 is a 12 volt charging plug, a 24 volt charging plug, a 36 volt charging plug, a 48 volt charging plug, a 120 volt charging plug, a 12 volt DC 5521 plug, an Anderson plug, or an MC4 cable plug. In some embodiments, one of the plurality of plugs 54 is a high voltage plug (e.g., a 240V AC single phase outlet). In some embodiments, the control panel 50 includes 12V AC plugs. In some embodiments, the plurality of plugs 54 includes one or more DC plugs, which may be 12V DC plugs, or 12V DC 5521 plugs made for DC led lighting or other DC appliances, or both may be present in an embodiment of the system. An embodiment may include USB plugs, one or more of which may be fast charging 2.9A USB A plugs, USBC fast charging 2.9A plugs, or both. The system 10 may provide multiple types of power simultaneously, through both AC and DC current plugs. In some embodiments, the control panel 50 includes a touch screen 70 (e.g., a LCD touch screen) configured as a user interface for the system 10. In some embodiments, the control panel 50 is formed as part of the housing 18 of the mobile transportation unit 14, 14B. The control panel 50 and/or controller 46 may receive commands through a network (e.g., a wired or wireless connection such as a cell phone or computer).

In some embodiments, one of the plurality of plugs 54 is configured to electrically connect to a second mobile-charging modular power system, similar to that described herein. In other words, the systems are modular and can be electrically coupled together to increase power capacity.

In some embodiments, the battery assembly 26 includes a battery management system that monitors a temperature, a charge rate, and a discharge rate of the battery assembly 26. In some embodiments, the battery management system is implemented on the controller 46.

The mobile-charging modular power system described herein is a mobile-charging mobile power supply unit that provides a modular, scalable power source. The mobile-charging modular power system may reside in a tow-behind trailer, for example, or a vehicle in other embodiments, with at least one axel and is mobile-charging in the sense that as the trailer is towed or vehicle moves the at least one axel rotates and while rotating generates electrical power which is stored in batteries in the trailer or vehicle. The mobile-charging modular power system doesn't require fossil or any other type of fuel to generate and deliver electricity because the system utilizes power generated by the rotation of the axel while moving. When the trailer is at rest, the batteries may be powered by solar energy power source, which is a renewable energy source not tethered to a power grid or fuel powered generator. The mobile-charging modular power system is modular in that the batteries may be connected and thus be scaled to accumulate and deliver larger amounts of energy, as in voltage or amperage, by increasing the number of batteries connected in a daisy-chain configuration.

The mobile-charging modular power system 10 is scalable in two ways—the addition of more batteries in a single system and/or through the combination of additional modular systems.

The system described herein may be placed in a trailer or may be placed in a vehicle without loss of functionality or limiting the system configuration.

In some embodiments, the system 10 is deployed in remote combat zones. Advantageously, the system 10 can be towed behind a military vehicle and can charge the battery assembly during transport. Once the battery assembly 26 is fully charged, the axle 22A with the electro-mechanical generator 34 may be raised by the actuator 58, placing it in an idle position. Raising the axle 22A when not needed improves fuel efficiency of the tow vehicle and improves the turning radius of the mobile transportation unit 14. When the system 10 reaches its destination, the axle 22A may be lowered once again to improve weight distribution, for example. Advantageously, when the system 10 is parked, it is configured to provide electrical power without a combustion powered generator that creates a heat signature that is detectable and disadvantageous in a combat zone.

Figure 4:
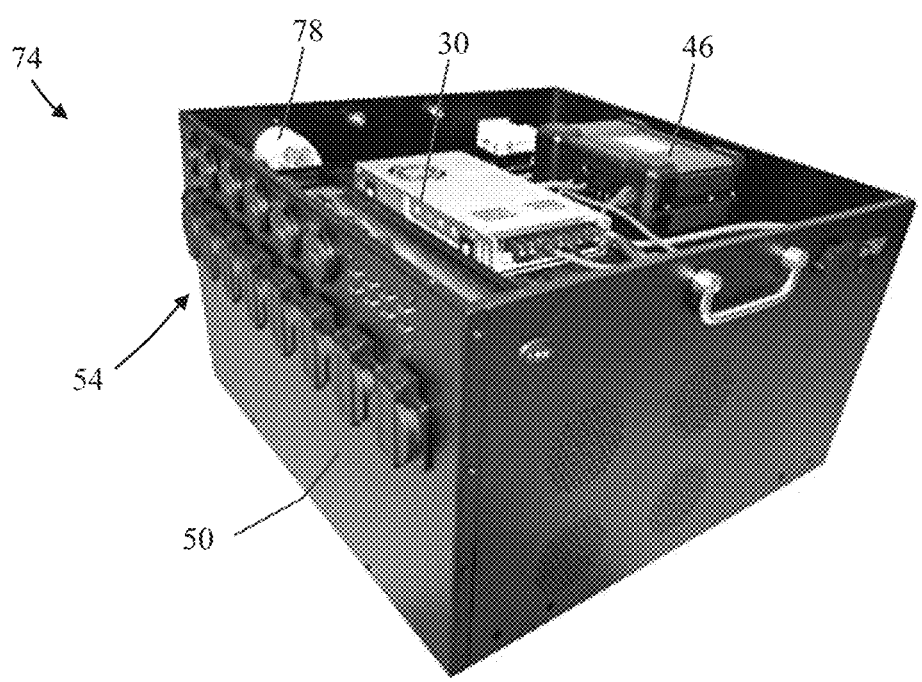
FIG. 4 is a perspective view of an electrical subassembly including a controller, a power electronics module, and a control panel.

With reference to FIG. 4, an electrical subassembly 74 is illustrated and includes the controller 46, a power electronics module 30, and a control panel 50. In some embodiments, the electrical subassembly 74 includes the batteries, electrical circuit controller, control panel, plugs, and connection and plugs. The electrical subassembly 74 is configured to be at least partially received within the housing 18 of the mobile transportation unit 14. In some embodiments, the electrical subassembly 74 includes a fan 78 to cool the electronics contained therein.

The mobile-charging modular power system, as described herein, receives generated power from the trailer axel or the solar panel, or both, and stores such electrical power in at least one battery. Electricity can then be drawn from or distributed by the system through a variety of electrical plugs attached to the system wherein such plugs are connected through a control panel to at least one battery. In some embodiments, the system is controlled by an electrical control panel communicating with an electrical circuit controller, where the electrical control unit may communicate using a wired or wireless communication to the electrical circuit controller, and the electrical control unit may receive commands from an interface on the box, through wired or wireless communication from resident on the system, or through wired or wireless communication another device such as a cell phone or a computer. The system 10 is controllable on site or remotely. In some embodiments, remote-control of the system 10 include wifi peer-to-peer, wifi cloud control, or Bluetooth peer-to-peer. In some embodiments, the output or the input of the battery assembly 26 be selectively turned on or off. In some embodiments, the inverter (e.g., AC portion of the output) can be selectively turned on or off.

The scalable solar power system receives power from the axel or connections made to power sources through plugs. In some embodiments, the control panel can accept electrical current from a variety of sources and provide electrical current to a variety of devices. Most importantly in this embodiment, the panel allows connection of solar panel power line through at least one solar input posts, such as an MC4. The solar input post can automatically detect the voltage of the solar panel attached thus facilitating inconsistent electrical power source flow. Any 12V, 24V, 36V or 48V solar panel or array of panels can be connected to charge this solar generator. The system in this example embodiment also has a 120 volt cable socket allowing power delivery by standard household power, a 12V DC 5521 socket for those who have a 12V grid (e.g., RV owners), and a connection allowing a daisy chain configuration of solar generator units (solar panels).

The scalable solar power system described herein includes at least one solar power generator, at least one plug to input or accept electrical current, at least one battery for storage of electricity, at least one plug to distribute electrical current, a control panel and electrical control unit to operate and otherwise control the system, and optional, additional plugs to accept power from other sources. In the embodiment of the system shown here, for example, the solar power generator is a portable solar panel. The system provides power in a number of AC and DC forms and is controlled by the electrical control unit to efficiently store and distribute power safely, and, avoid overheating or dangerous power distribution.

In some embodiments, the mobile-charging modular power system described herein includes a container attached to a mobile transportation unit wherein the mobile transportation unit includes at least one axel; the container including at least one battery capable of receiving electrical current, storing electrical energy, and discharging electrical current enclosed within the container. The system further includes an electrical circuit controller electrically connected to a control panel and the electrical circuit controller electrically connected to at least one battery, wherein the electrical circuit controller is capable of monitoring and controlling electrical current flowing bidirectionally between the at least one battery and the electrical circuit controller. The system further includes an electrical connection between at least one electrical plug attached to the control panel and the electrical circuit controller, at least one electrical generating device connected to the at least one axel and connected to the circuit controller, and at least one solar power generating system connected to the circuit controller. The system includes an electric connection line connected to the solar power generating system at one end and the opposite end connected to the electrical circuit controller.

It will be readily apparent to those skilled in the art that other suitable modifications. It is understood that the foregoing detailed description and accompanying examples are merely illustrative and are not to be taken as limitations upon the scope of the disclosure, which is defined solely by the appended claims and their equivalents. Various changes and modifications to the disclosed embodiments will be apparent to those skilled in the art. Such changes and modifications of the disclosure may be made without departing from the spirit and scope thereof.

What is claimed is:

1. A mobile-charging power system comprising:
    a mobile transportation unit including a housing and an axle;
    a battery assembly positioned within the housing;

a power electronics module electrically coupled to the battery assembly;

an electro-mechanical generator electrically coupled to the power electronics module, wherein the electro-mechanical generator is driven by the axle;

a solar power generator coupled to the housing; the solar power generator is electrically coupled to the power electronics module;

a controller electrically coupled to the battery assembly and the power electronics module;

a control panel electrically coupled to the power electronics module and the controller, the control panel includes a first electrical plug and a second electrical plug; and an actuator coupled to the axle and configured to move the axle;

wherein the axle is a first axle and the mobile transportation unit further includes a second axle; wherein the system further includes a sensor to detect a speed of the mobile transportation unit.

2. The system of claim 1, wherein the battery assembly includes a solid-state lithium battery.

3. The system of claim 2, wherein the solid-state lithium battery includes a polymer electrolyte and includes no liquid.

4. The system of claim 1, wherein the actuator is a hydraulic actuator.

5. The system of claim 1, wherein the actuator moves the first axle in response to the speed of the mobile transportation unit detected by the sensor.

6. The system of claim 5, wherein the actuator moves the first axle in response to a voltage of the battery assembly exceeding a threshold voltage.

7. The system of claim 1, wherein the power electronics module includes an AC to DC converter.

8. The system of claim 1, wherein the power electronics module includes a DC to AC inverter.

9. The system of claim 1, wherein the power electronics module includes an AC to DC converter and a DC to AC inverter.

10. The system of claim 1, wherein the first electrical plug on the control panel is configured to discharge electrical current.

11. The system of claim 1, wherein the second electrical plug on the control panel is configured to receive electrical current.

12. The system of claim 1, wherein the battery assembly includes a battery management system that monitors a temperature, a charge rate, and a discharge rate of the battery assembly.

13. The system of claim 1, wherein system is configured to be towed behind a vehicle.

14. The system of claim 1, wherein the electro-mechanical generator is coupled to a differential gear train.

15. The system of claim 1, further including a plug configured to electrically connect to a second mobile-charging modular power system.

16. The system of claim 1, wherein the mobile transportation unit is selected from a group comprised of a trailer, a vehicle, a fifth-wheel attached to a vehicle, or a fifth-wheel attached to a trailer.

17. A mobile-charging power system comprising:

a mobile transportation unit including a housing and an axle;

a battery assembly positioned within the housing;

a power electronics module electrically coupled to the battery assembly;

an electro-mechanical generator electrically coupled to the power electronics module, wherein the electro-mechanical generator is driven by the axle;

a solar power generator coupled to the housing; the solar power generator is electrically coupled to the power electronics module;

a controller electrically coupled to the battery assembly and the power electronics module;

a control panel electrically coupled to the power electronics module and the controller, the control panel includes a first electrical plug and a second electrical plug; and a plug configured to electrically connect to a second mobile-charging modular power system.

18. The mobile-charging power system of claim 17, further including an actuator coupled to the axle and configured to move the axle; wherein the axle is a first axle and the mobile transportation unit further includes a second axle; and wherein the system further includes a sensor to detect a speed of the mobile transportation unit.

19. The mobile-charging power system of claim 18, wherein the actuator moves the first axle in response to the speed of the mobile transportation unit detected by the sensor, and wherein the actuator moves the first axle in response to a voltage of the battery assembly exceeding a threshold voltage.

20. The mobile-charging power system of claim 17, wherein the electro-mechanical generator is coupled to a differential gear train.

* * * * *